No. 896,306. PATENTED AUG. 18, 1908.
W. LEWIS.
METAL SAWING MACHINE.
APPLICATION FILED JAN. 26, 1906.
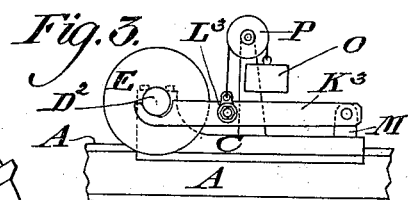
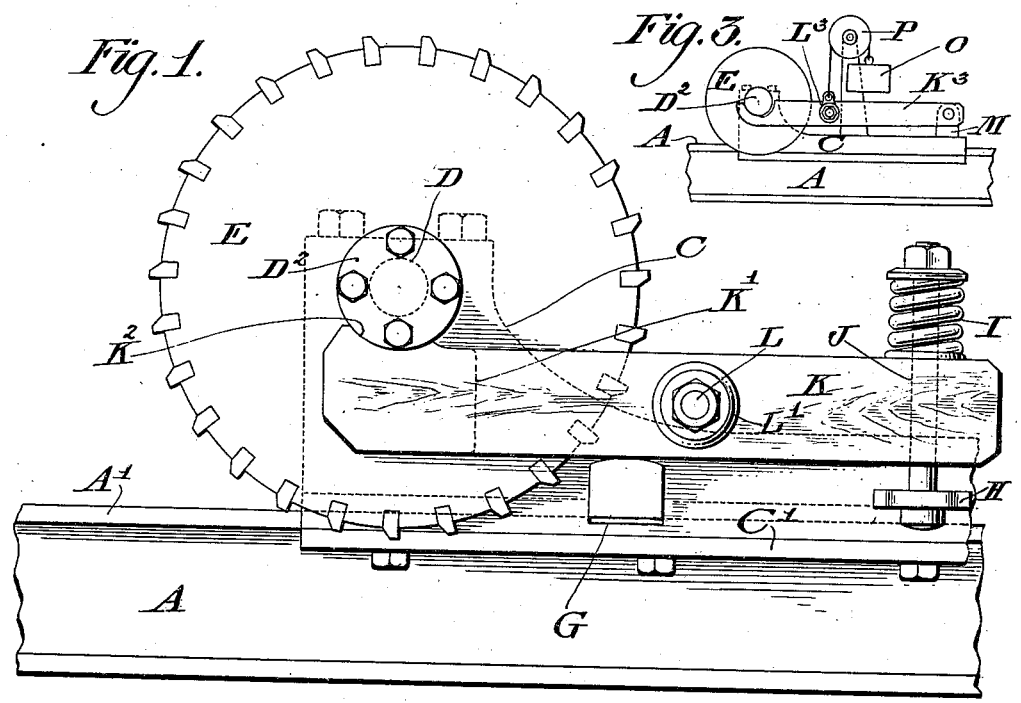
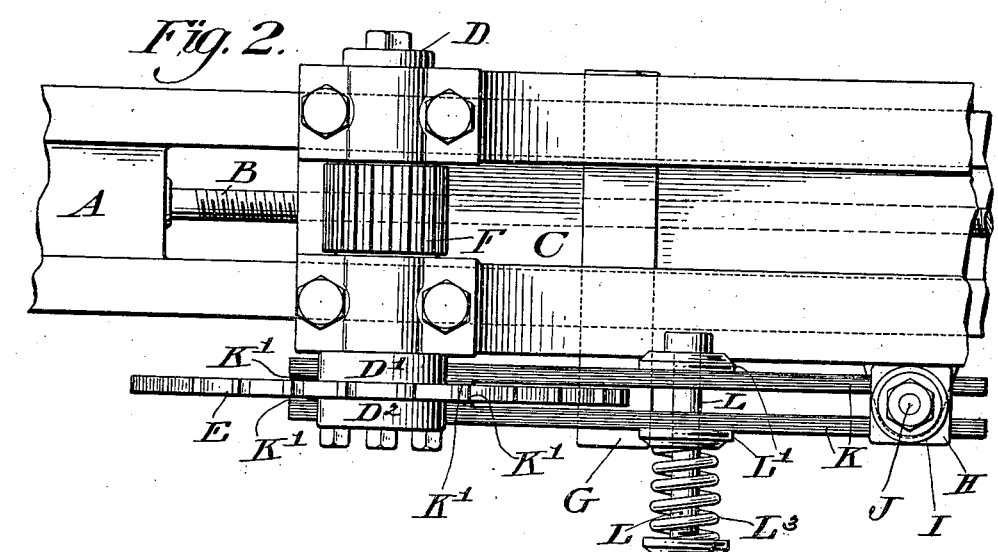
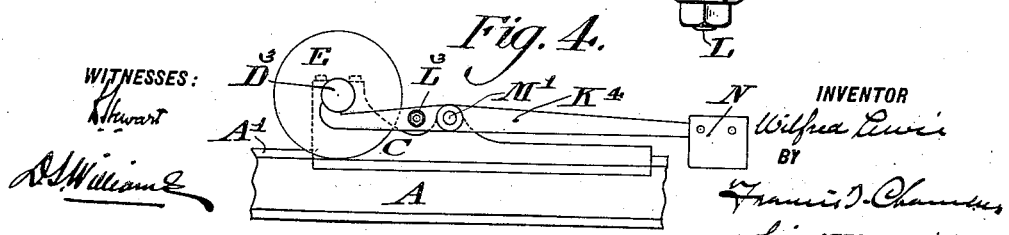
WITNESSES:
INVENTOR
Wilfred Lewis
BY
ATTORNEY.

ized to
UNITED STATES PATENT OFFICE.

WILFRED LEWIS, OF PHILADELPHIA, PENNSYLVANIA, ASSIGNOR TO THE TABOR MANUFACTURING COMPANY, OF CAMDEN, NEW JERSEY, A CORPORATION OF NEW JERSEY.

METAL-SAWING MACHINE.

No. 896,306.　　　Specification of Letters Patent.　　　Patented Aug. 18, 1908.

Application filed January 26, 1906. Serial No. 297,924.

To all whom it may concern:

Be it known that I, WILFRED LEWIS, a citizen of the United States of America, residing in the city and county of Philadelphia, in the State of Pennsylvania, have invented a certain new and useful Improvement in Metal-Sawing Machines, of which the following is a true and exact description, reference being had to the accompanying drawings, which form a part thereof.

My invention relates to metal sawing machines, and has for its object to provide an efficient braking device for preventing chatter of the saw such as is apt to occur especially when the saw is used on work of irregular conformation.

I am aware that a brake has been used in connection with a metal cutting saw and do not claim broadly to be the inventor of such a brake, my present invention consisting in a braking device made up of two braking or friction pads resting against the saw blade on opposite sides thereof and drawn together and in proper contact with the saw blade by resilient means.

In the drawings in which my invention is illustrated Figure 1, is a side elevation of a metal sawing machine equipped with my improved braking device. Fig. 2, is a plan of the same machine, and Figs. 3 and 4, elevations illustrating modifications in the construction of the general braking apparatus.

A, indicates the shears supporting the guideways A', A'; B, indicating the feed screw by which the housing is moved on the guideways.

C, is the housing resting on the guideways and held in position thereon by flanges C'.

D, is a saw supporting and actuating spindle supported in suitable bearings in the housing and carrying on its end the blade E, which is shown as secured between the collars or heads indicated at D', D².

F, is a gear wheel secured to the shaft and by which it is actuated by a proper connecting mechanism not shown.

G, is a fulcrum beam or block moving on the guideway but so engaged with the housing as to move with it.

H, is a bracket extending out from the side of the housing and serving as a support for a bolt J, which is used for supporting and adjusting pressure on the spring I, which rests against the ends of clamping boards or beams K, K, which, in the construction illustrated, also act as levers fulcrumed on the beam G, and having their outer ends K², conformed to the shape of the collars D', D², and pressed against the said collars by the action of the spring I. In their function, however, as levers the boards or beams K, K, are not within the scope of my present application, as in this combination and mode of operation they form the subject matter of my co-pending application for Letters Patent filed January 26, 1906, Serial No. 297,923.

The beams K, K, are formed or provided with braking pads K', K', which rest against opposite sides of the saw blade E, and are pressed against the saw blade by resilient pressure, preferably by the action of a spring L³, which, as shown in Fig. 2, is secured on the bolt L, and acting through the clamping washers L', L', draws the beams K, K, and their friction pads K', K', together and in contact with the saw, the friction thus applied to the saw overcoming its tendency to chatter with the accompanying danger of breakage of teeth.

Figs. 3 and 4, simply illustrate how the spring actuating clamping beams can be applied in other constructions than that shown in Figs. 1 and 2; for instance, in Fig. 3, the beam here indicated at K³, is fulcrumed at M, and drawn up against the spindle by the action of a counter weight O connected with the clamping levers by a cord passing over a pulley P, while in Fig. 4, the clamping beams here indicated at K⁴, are fulcrumed at M', and pressed against the spindle of the saw by the action of a counter weight N.

Having now described my invention, what I claim as new and desire to secure by Letters Patent is:

In a machine for sawing metals consisting of a housing, a saw spindle supported therein and a saw secured to the spindle, the combination therewith of two beams or planks supported on the housing and extending on each side of the saw blade, brake pads on said beams resting against the sides of the saw and a spring acting to draw the beams together and press the pads against the saw.

WILFRED LEWIS.

Witnesses:
　ARNOLD KATZ,
　D. STEWART.